UNITED STATES PATENT OFFICE.

SHERWOOD P. SNYDER, OF DAYTON, OHIO.

FOOD PRODUCT.

1,385,503. Specification of Letters Patent. Patented July 26, 1921.

No Drawing. Application filed December 15, 1919. Serial No. 345,005.

*To all whom it may concern:*

Be it known that I, SHERWOOD P. SNYDER, a citizen of the United States, residing at Dayton, in the county of Montgomery and State of Ohio, have invented certain new and useful Improvements in Food Products, of which the following is a specification.

My invention relates to improvements in food products, and more particularly to salads composed of fruit, vegetables or meats intermixed with sauce or dressing of the mayonnaise type, and especially the dressing mixture for such salad.

The object of the invention is to provide a salad dressing mixture which will not only be wholesome and pleasing to the taste, but will be pleasing in appearance, economical in preparation, having good keeping qualities, and one in which the ingredients will remain in a state of suspension for considerable periods of time.

While olive oil and other vegetable oils are generally recognized as wholesome and valuable food products, there are many persons to whom olive oil or other vegetable oils are not only distasteful, but in fact, repulsive. In the present combination the vegetable oil is so disguised and modified that it is difficult of detection even by experts in the culinary arts. The preparation forming the subject matter hereof has the appearance and to a very great extent, the taste of having been prepared with cream, yet cream which would cause it to rapidly deteriorate does not enter into its composition.

With the above primary and other incidental objects in view as will more fully appear in the specification, the invention consists of the combination of the ingredients or materials in suitable balanced ratio, not necessarily in the exact proportions hereinafter specified, but in such approximation thereto as will produce substantially the same results, or the equivalents of such ingredients and mode of combination, as hereinafter described and set forth in the claims.

The dressing mixture comprises a mass of starchy material which may comprise wheat flour, rice flour, potato flour, corn starch or other analogous starch products, mixed with an acidifying liquid, which is preferably though not necessarily a mixture of water and vinegar, the mixture being then cooked. The cooked mass is then thoroughly aerated usually by being well beaten or thoroughly stirred, during which time egg yolks are preferably added, although butter coloring material may be substituted to afford a rich yellow appearance. Such material being thoroughly incorporated by the beating and the mixture being partly cooled during the aerating and mixing process, salt sufficient to taste is added, and while being stirred the mixture is modified by the gradual addition of vegetable oil. Finally the mixture is flavored by the addition of a spice usually ground mustard, which has been previously dissolved or intermixed with a small quantity of vinegar. The complete combination is then thoroughly beaten or stirred to effect the proper and uniform intermingling of the ingredients and to aerate the mixture which eventually becomes a "smooth" cream-like preparation.

The proportions of ingredients and mode of mixture which have been found most efficient are as follows:

Stir eight pounds of flour smooth with twelve pints of water. Bring eighteen pints of water to the boiling point, and at the same time boil ten pints of vinegar. The boiling water and the boiling vinegar are then stirred into the flour paste. This acidified pasty mixture is then cooked. The cooking is preferably conducted in a steam jacketed kettle, but may be carried on in a kettle directly over the fire. The cooked preparation is turned into a mixing bowl and three pints of egg yolks are added. The mixture is then beaten thoroughly until the temperature is reduced to approximately 98 degrees Fahrenheit, at which time there are added eight ounces of salt, five gallons of vegetable oil, preferably though not necessarily olive oil, are gradually added while beating the mixture, and finally nine ounces of ground mustard stirred smooth with one pint of vinegar is added. The whole is then beaten until the dressing is perfectly smooth. If compounded in the proportions given, some type of power mixer will be required. However, the quantity may be reduced to any desired amount by proportionately reducing the quantities of the several ingredients. Moreover, the relative proportions of the ingredients as given may be varied to some extent or within reasonable limit without materially changing the character of the dressing. Likewise the ingredients may be combined in a number of different ways or in different orders from that given above without materially affecting the quality of the product.

While as the before stated, various forms of starchy materials such as wheat flour, rice flour, potato flour or corn starch may be employed, it has been found by experience that the best flavor is produced by the use of soft wheat flour. For the best result and pleasing taste, a certain balance should be maintained between the starchy material and the vegetable oil. This balance is of course variable within such limit as not to afford a predominating flavor of either material, and is to some extent dictated by the particular character of the starch and the oil. The proportions heretofore stated afford the most efficient balance when soft wheat flour and a good grade of vegetable oil are used. If less flour than the formula specifies is used the flavor of the oil becomes more pronounced. While if a larger quantity of flour than specified in the formula is used a starch flavor is imparted to the dressing. When properly combined, whatever the character or quality of the starch and oil may be, the one neutralizes the other so that the oil takes away the starch flavor, while the starch destroys the oily taste.

The dressing prepared in the manner and proportions heretofore stated or in properly balanced ratios in the event that starches and oils of different characters are employed, affords a smooth mixture pleasing in appearance and to the taste, and having the indication of being prepared with cream. In preparing a salad boiled diced potatoes, onions, and celery are intermixed in any desired proportions as the housewife or chef may prefer. To this are added salt and sugar to taste and an added amount of vinegar. This seasoned vegetable mass is then intermixed with the dressing heretofore described. In lieu of a potato salad as described, cabbage may be shredded, diced, or chopped and pimento also cut fine added. This mixture is then seasoned with salt and sugar and vinegar to taste, and the mixture combined with the dressing, made according to the above formula. The dressing is also used in combination with various kinds of fruit in the production of fruit salad, or with lettuce, endive, or chard, and is also very desirable for intermixing with fish or meats in the preparation of a meat and fish salad. An important element is the use of the cooked starch and a suitable oil in a properly balanced ratio, as the base to which may be added various other ingredients. While eggs, as specified, are a desirable ingredient, and are advantageous, they are not an absolute necessity but may be omitted without materially injuring the resulting dressing. While the eggs add to the food value their principal purpose is to give a pleasing color. In the event eggs are eliminated, commercial butter coloring may be substituted to give the desired rich yellow appearance.

From the above description, it will be apparent that there is thus provided a salad dressing suitable for various salad combinations, possessing the particular features of advantage before enumerated as desirable, but which obviously is susceptible of modification in the quality and proportions of its ingredients, the details of production, and the order of combinations without departing from the principle involved or sacrificing any of its advantages.

While in order to comply with the statutes, the invention has been described in language more or less specific as to certain features of procedure and proportions of ingredients, it is to be understood that the invention is not limited to the specific details mentioned, but that the formula and process herein disclosed comprise but one of several modes of putting the invention into effect, and the invention is therefore claimed in any of its forms or modifications within the legitimate and valid scope of the appended claims.

Having thus described my invention, I claim:

1. A food product of the character described comprising a mass of starchy materials cooked in an acidifying liquid, to which are added fatty and albuminous materials, a vegetable oil and condiments.

2. A salad material comprising a cooked flour mixture containing vinegar, uncooked beaten eggs and a vegetable oil, the cooked flour and oil being intermixed in such proportion that the flavor of one will substantially neutralize that of the other, to which mixture are added mustard and salt.

3. A salad dressing for vegetable, meat or fish products comprising a cooked acidified mass of starchy materials to which has been added egg yolks and salt, the mixture being modified with a vegetable oil in sufficient quantity to blend the flavor of the oil and the starch one with the other, and flavored with mustard.

4. The herein described method of preparing a salad dressing or like food consisting in cooking a mass of starchy materials in an acidified liquid, adding egg yolks and beating the mixture, adding salt, modifying the mixture with a vegetable oil in sufficient quantity to balance the starch and cause the flavors of the oil and starch to be substantially neutralized one by the other and adding mustard.

5. A salad dressing containing cooked starchy material and an oil in such substantially balanced proportions that the characteristic flavor of one is counteracted and blended with that of the other.

In testimony whereof, I have hereunto set my hand this 28th day of November A. D. 1919.

SHERWOOD P. SNYDER.

Witnesses:
WILLIAM A. SWANEY,
GEORGE C. HELMIG.